(12) United States Patent
McCarty et al.

(10) Patent No.: US 7,194,640 B2
(45) Date of Patent: Mar. 20, 2007

(54) ALTERNATE NON-VOLATILE MEMORY FOR ROBUST I/O

(75) Inventors: Christopher McCarty, Colorado Springs, CO (US); Jeffrey Rogers, Colorado Springs, CO (US); Bruce Trunck, Monument, CO (US)

(73) Assignee: LSI Logic Corporation, Milpitas, CA (US)

( * ) Notice: Subject to any disclaimer, the term of this patent is extended or adjusted under 35 U.S.C. 154(b) by 388 days.

(21) Appl. No.: 10/730,154

(22) Filed: Dec. 8, 2003

(65) Prior Publication Data

US 2005/0125586 A1 Jun. 9, 2005

(51) Int. Cl.
G06F 1/00 (2006.01)
G06F 13/00 (2006.01)

(52) U.S. Cl. ..................... 713/300; 711/113
(58) Field of Classification Search ............... 713/300; 711/113

See application file for complete search history.

(56) References Cited

U.S. PATENT DOCUMENTS

| | | | | |
|---|---|---|---|---|
| 5,379,417 A * | 1/1995 | Lui et al. ............ 713/300 |
| 5,448,719 A * | 9/1995 | Schultz et al. ............ 714/5 |
| 5,469,453 A * | 11/1995 | Glider et al. ............ 714/6 |
| 5,533,190 A * | 7/1996 | Binford et al. ............ 714/6 |
| 5,550,975 A * | 8/1996 | Ichinomiya et al. ......... 714/51 |
| 5,586,248 A * | 12/1996 | Alexander et al. ......... 714/22 |
| 6,295,577 B1 * | 9/2001 | Anderson et al. ......... 711/113 |
| 6,480,933 B1 * | 11/2002 | Cargemel et al. ......... 711/113 |

OTHER PUBLICATIONS

James Dillon and David Lindley, "Online Exclusive: Discrete Memories Trade Off with ASIC Cells", Jan. 3, 2002, EETimes.*

* cited by examiner

Primary Examiner—Thomas Lee
Assistant Examiner—Ji H. Bae
(74) Attorney, Agent, or Firm—Suiter•Swantz PC LLO

(57) ABSTRACT

The present invention relates to a method, circuit, and system for performing write journal operations on a bus interface controller board or bus interface controller integrated circuit chip. This is achieved by placed a write journal memory on the board or chip and supplying power to it from an external power source. Preferably, the external power source is a battery. The internal memory may use bus interface controller power when available to prolong battery life.

25 Claims, 4 Drawing Sheets

ALTERNATE NON-VOLATILE MEMORY FOR ROBUST I/O

FIELD OF THE INVENTION

The present invention generally relates to the field of memory devices, and particularly to an internal memory for a bus interface controller card or integrated circuit chip.

BACKGROUND OF THE INVENTION

Data availability and data protection are key aspects of storage solutions and determine the reliability of a system. The more robust an algorithm is in providing data availability and data protection, the more reliability the system has and the more the user's information will be protected. Users can typically tolerate short periods of time when they cannot access the information in the storage subsystem, but they cannot tolerate the permanent loss of their data. There are many reasons that data can get lost in the storage subsystem. The following is a short list of examples: hardware failure, software failure, and power failure. Some of these can be solved with the following approaches. One way to protect against hardware failure is with the use of RAID algorithms. These algorithms use redundant information on other drives to recreate the data on the failed drive when a new drive replaces the failed drive. These algorithms are standard practice in the industry. But, RAID only protects against a hardware failure. There are still potential ways that data can be lost when power is lost during the write of data to the drive. These writes take a finite amount of time and if the power is lost during this time, then the data that is being written may only get partially written or not at all. This can have a large impact, not only on the integrity of the data, but also on the consistency of the RAID algorithm. The partially written data will no longer match the redundant data on another drive. RAID controllers remove the data integrity problem by adding a battery-backed cache to the RAID controller. The cache is used as a buffer to store the write data until it has been successfully written to disk. Once that data has been successfully written to disk, the data can be deleted from the cache. The battery is used to keep the write data valid across power cycles. After power is lost and the data has not been successfully written to disk, then the controller will reattempt to write the data to the disk after the power has returned. The disadvantage of this solution is the cost of the battery and the cost of the external memory for the cache data.

One of the biggest issues with the RAID algorithms is to maintain the consistency of the data between the real data and the redundant data information. This is also known as keeping the data synchronized. One of the ways that data can get unsynchronized is when the write to the real data disk completes, but the write to the redundant data information disk does not complete successfully. The solution to this problem is to detect when one write completes and the other write does not. Logging the write information to each disk and keeping track of when each one completes can detect when the writes do not complete. This is known as Write Journaling. The logging information must be kept in some type of non-volatile memory to keep the logged information valid across power cycles. The entry in the write journal will be deleted when all writes complete. If an entry is detected at power-on, then the data can be resynchronized only on the region affected by this write command. Placing the non-volatile memory external to the controller is not a cost effective solution.

Therefore, it would be desirable to provide a method, circuit, and system for providing an internal memory to a bus interface controller card or chip.

SUMMARY OF THE INVENTION

Accordingly, the present invention is directed to a method, circuit, and system for providing an internal memory to a bus interface controller card or chip by providing a back up power source in case general power to the card or chip fails.

The present invention offers a cost effective solution is to bring the non-volatile memory internal to the controller, thus eliminating the external part. Accordingly, memory is brought internal to the controller. This can be provided in a variety of ways depending on how long the memory is needed to be non-volatile. An external battery provides the non-volatile aspect of the internal memory in a cost effective way while retaining board functionality.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention relates to a method and circuit for locating a non-volatile memory internal to the controller, especially for a Small Computer System Interface (SCSI) controller. For memory to be non-volatile, it must maintain its data while the system power has been removed. This can be achieved using internal volatile memory and an external battery to power the internal memory during the system power down time. The battery is usually much more cost effective than an external non-volatile memory part, thus lowering the overall solution cost of a write journaling implementation. The type of write journaling addressed by the present invention is at the input/output (IO) level; especially, for the Small Computer System Interface (SCSI) CDB level. In IO write journaling, the operating system (OS) file system driver sends IOs (e.g., SCSI CDBs) to the SCSI controller. The firmware (FW) inside the SCSI controller logs these IOs to the journal. After the IO is completed, the FW will remove the logged entry from the journal. By logging the IOs in the journal, it can be determined whether all the IOs have been completed, even when power is interrupted or a system reset occurs. If IOs are detected in the journal at power up or system reset, then the FW can take action to keep the RAID volume consistent (synchronized).

Figure 1:
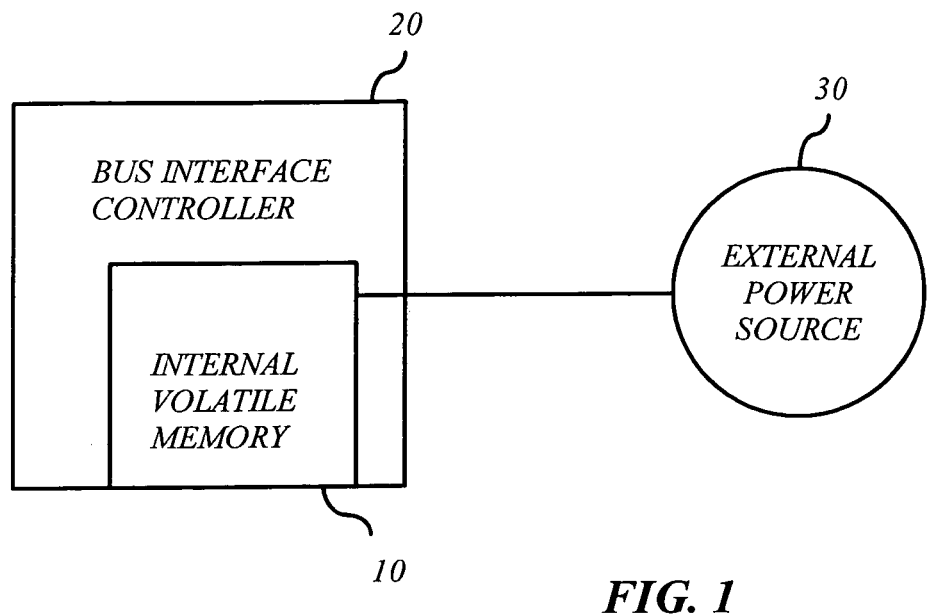
FIG. 1 illustrates an embodiment of the general system of the present invention.
Figure 2:
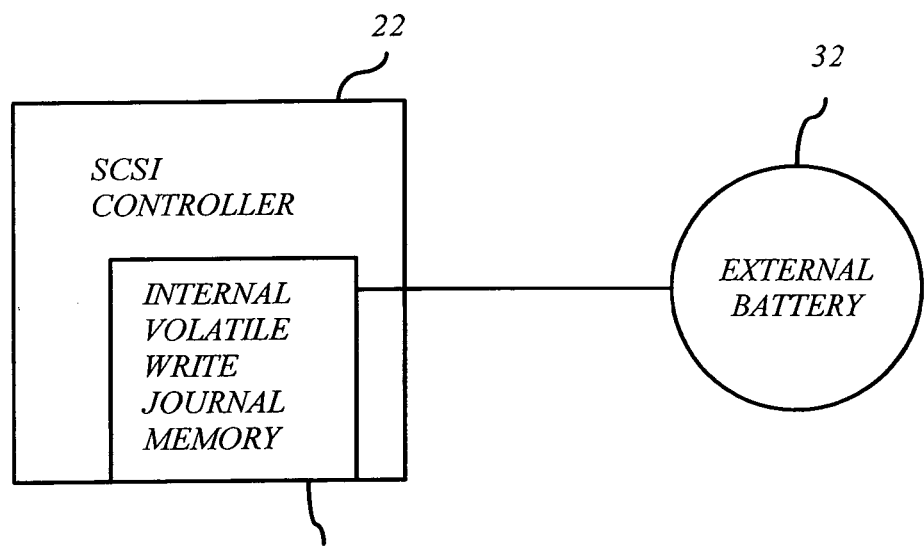
FIG. 2 illustrates an embodiment of a specific system of the present invention.

FIGS. 1 and 2 illustrate block diagrams of a general embodiment and a more specific embodiment of the present invention. In FIG. 1, a bus controller interface card or integrated circuit chip 20 contains an internal volatile memory 10, such as a random access memory (RAM). The internal volatile memory is provided with power from an external power source 30. The external power source may be an alternating current to direct current (AC-to-DC) converter which receives 110 volt, 60 Hertz power and transforms it to a DC voltage through a bridge, transformer, smoothing capacitors, electrolytic capacitors, filters, and/or the like. In the preferred embodiment, as shown in FIG. 2, the power source is a battery 32. The battery life is one of the key parameters with this solution. Batteries only have a limited life while they are being used, so limiting the time when the battery is in use will prolong the life of the battery. The following lists two ways to prolong the life of the battery: 1) Only use the battery power when the system is off. Requires a way to switch from system power to battery power. 2) Only use the battery power when there is data in the Write Journal and the system power is off.

Figure 3:
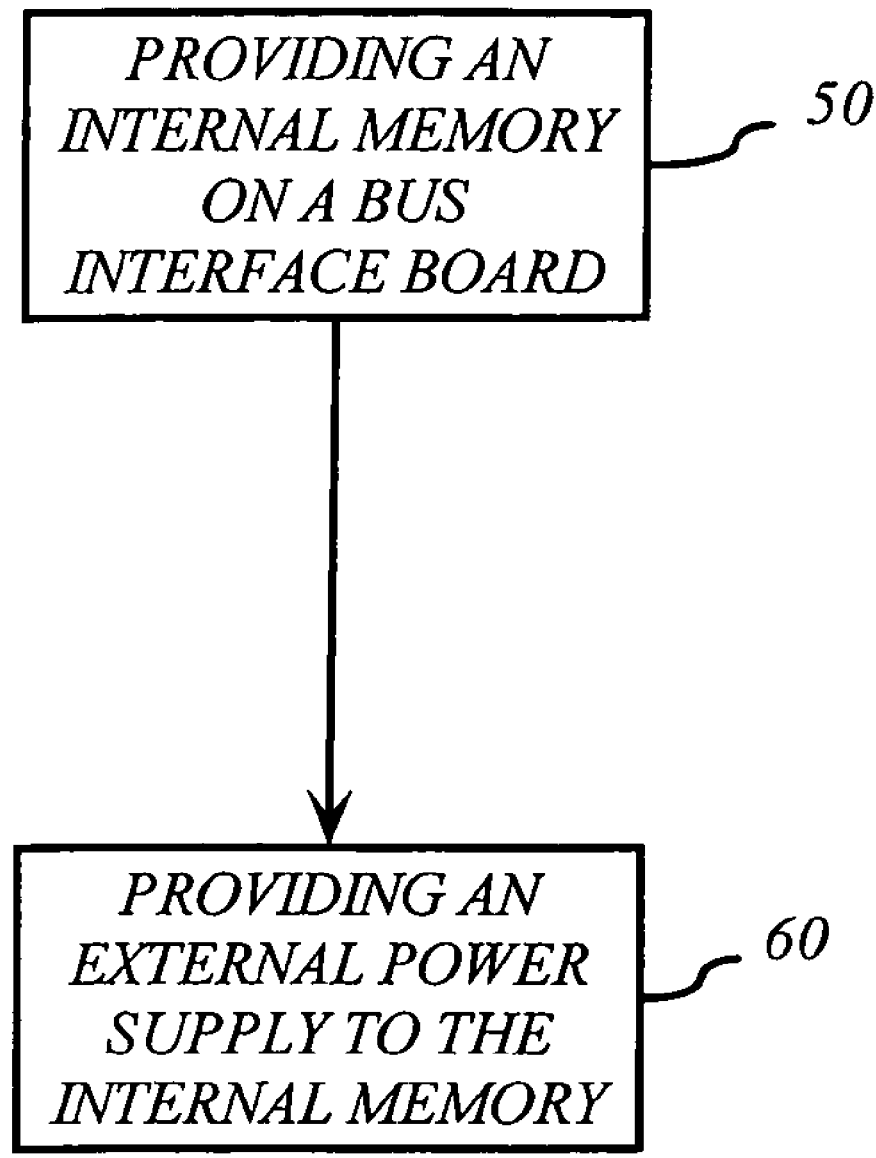
FIG. 3 illustrates an embodiment of a method for creating a system or circuit of the present invention.

FIG. 3 illustrates an embodiment of a method for creating a system or circuit of the present invention. An internal memory is provided on a bus interface board or integrated circuit chip 50. The internal memory may be located on a bus interface integrated circuit chip or may be a separate integrated circuit chip of the bus interface controller board. An external power supply is provided to the internal memory 60. Preferably, the external power supply is switched on only when power is not being supplied to the bus interface controller board.

Figure 4:
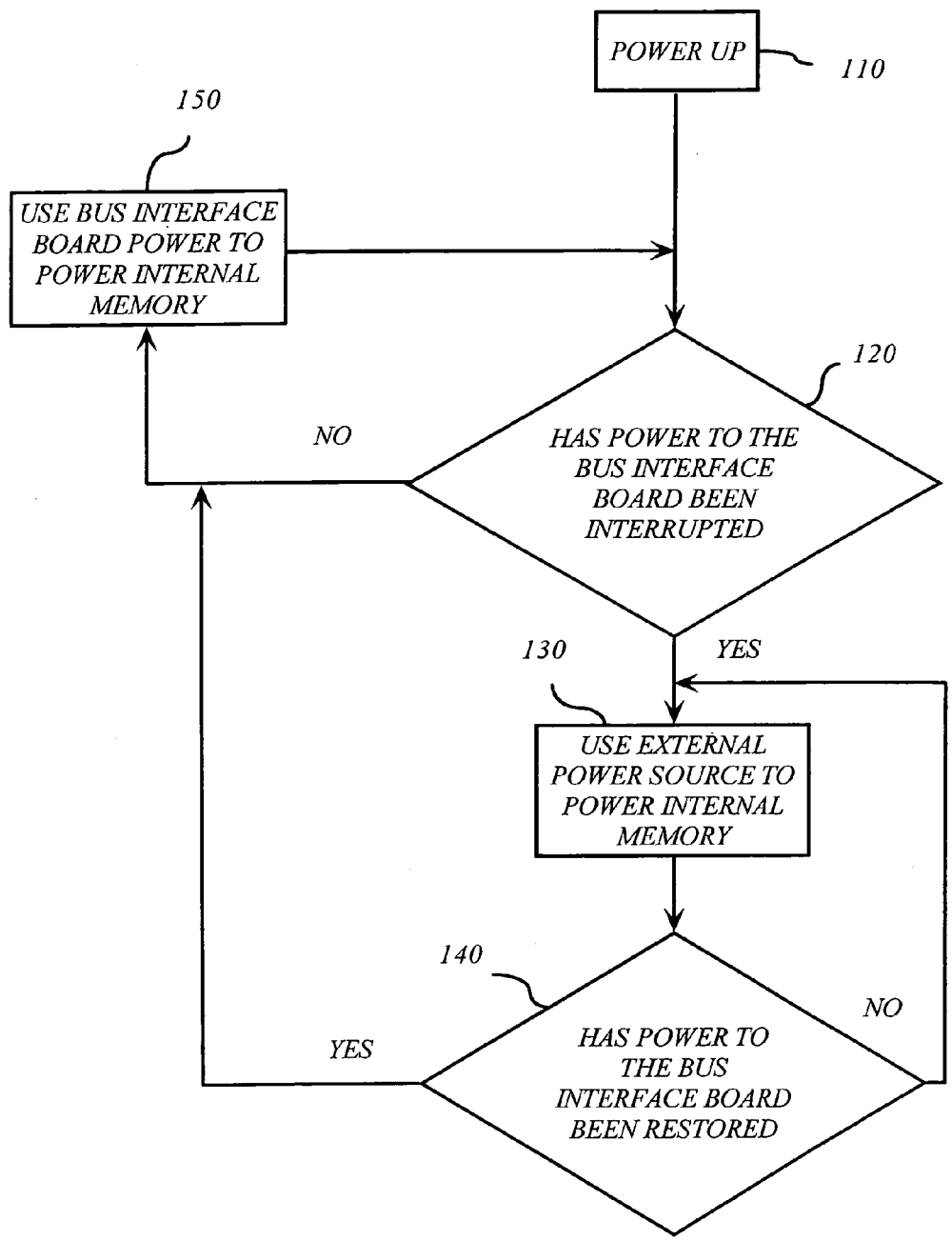
FIG. 4 illustrates a method of applying power to the internal memory in the present invention.

FIG. 4 illustrates a method of applying power to the internal memory in the present invention. The bus interface controller board is initially powered up 110. A determination is made as to whether power to the bus interface controller board has been interrupted 120. The interruption may be a power down condition or a power instability condition. If power has not been interrupted, then the bus interface board power continues to be used to power the internal memory of the bus interface controller board 150. Otherwise, the external power source is used to power internal memory 130. A determination is made as to whether bus interface controller board power has been restored 140. If it has not, processing returns to step 130. If it has, switching circuitry switches to power the internal memory from the bus interface controller board 150.

Figure 5:
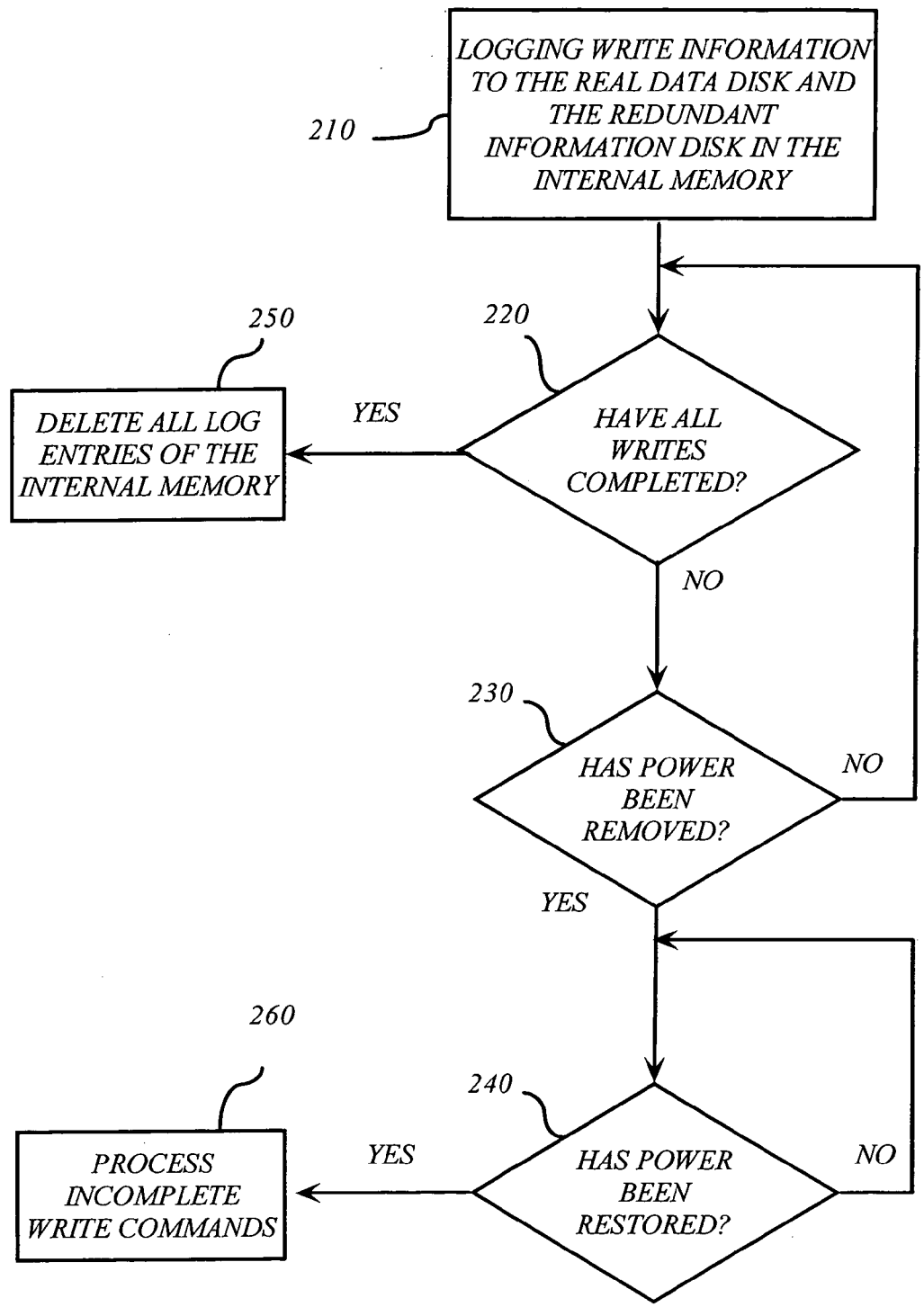
FIG. 5 illustrates an embodiment of a write journaling method of the present invention.

FIG. 5 illustrates an embodiment of a write journaling method of the present invention. After initialization, write information to the real data disk and the redundant information disk is logged in the internal memory 210. If it is determined that all writes have been completed 220, all log entries are deleted from the internal memory 250. Otherwise, a determination is made as to whether power has been removed 230. If it has not, process returns to step 220. That is, write journaling continues. If it is determined that power has been removed or interrupted significantly 230, then a determination is made as to whether power has been restored 240. As along as it is determined that power is removed 240, a wait loop is in effect. When it is determined that power is restored 240, incomplete write commands are processed. Incomplete write commands will only be processed if power is interrupted and entries remain in the write journal when power is reapplied. In an alternative embodiment, instead of deleting log entries from the internal memory, the log entries may be transferred from the internal memory to a mass storage device or other non-volatile memory.

The present invention may be practiced in a variety of other ways. The bus interface controller board or integrated circuit chip may include a Peripheral Component Interconnect (PCI) controller, a Small Computer System Interface (SCSI) controller, a Redundant Array of Independent Disks (RAID) controller, or another type of controller.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A system for recovering data lost due to a power instability occurring during a write operation, comprising:
   a data disk;
   a bus interface controller;
   a write journal memory on the bus interface controller; and
   an external power source for providing power to the write journal memory, the external power source being located externally with respect to the bus interface controller,
   wherein, the write journal memory maintains a log of write operations to the data disk,
   wherein, the log of write operations is used to recover write operations interrupted by a power instability for reissue;
   wherein, following reissue of recovered write operations, log entries for recovered write operations are transferred to a storage device.

2. The system of claim 1, wherein the bus interface controller is a Small Computer System Interface (SCSI) controller board.

3. The system of claim 2, wherein the write journal memory is a random access memory (RAM).

4. The system of claim 3, wherein the external power source is a battery.

5. The system of claim 3, wherein the external power source includes an electrolytic capacitor.

6. The system of claim 3, wherein the external power source is provided from an alternating current to direct current (AC to DC) converter.

7. The system of claim 6 wherein power to the AC to DC converter is provided through a 110 volt, 60 Hertz alternating current power source.

8. The system of claim 1, wherein the write journal memory is part of a bus interface controller integrated circuit chip located on the bus interface controller.

9. The system of claim 1, wherein the bus interface controller is a printed circuit board that has a bus interface controller integrated circuit chip and an internal memory chip.

10. The system of claim 4, wherein the battery supplies power to the write journal memory only when bus interface controller power is turned off.

11. The system of claim 4, wherein the battery supplies power to the write journal memory only when there is valid write journal memory and bus interface controller power is off.

12. A method for recovering data lost due to a power instability during a write operation comprising:
   logging write information to a real data disk and to a redundant data information disk in a memory internal to a bus interface controller unit;
   providing power to the internal memory through an external power source;
   recovering write operations interrupted by the power instability using a log of write operations stored in the internal memory;
   reissuing interrupted write operations; and
   transferring log entries for recovered write operations to a storage device.

13. The method of claim 12, wherein logging write information includes recording completed and incomplete write operations to the real data disk and the redundant data information disk in the internal memory.

14. The method of claim 12, wherein logging write information includes recording completed write operations to the real data disk and the redundant data information disk in the internal memory.

15. The method of claim 12, wherein logging write information includes recording incomplete write operations to the real data disk and the redundant data information disk in the internal memory.

16. The method of claim 12, further comprising deleting logged write information from the internal memory when all writes complete.

17. The method of claim 12, further comprising, detecting when the power to the bus interface controller unit becomes unstable.

18. The method of claim 17, further comprising, waiting for power restoration before recovering the interrupted write operations.

19. The method of claim 18, wherein the step of recovering comprises determining if entries remain in the log of write operations following restoration of power after the power instability.

20. The method of claim 19, wherein the step of recovering further comprises processing any incomplete write operations if entries are determined to remain in the log of write operations.

21. A system for maintaining a write journal on a bus interface controller board, comprising:
   means for controlling a bus interface located on a bus interface controller board;
   means for logging a write journal of write activity for a storage device, the means for logging a write journal being located on the bus interface controller board;
   means for supplying power to the means for logging a write journal, the means for supplying power being external to the bus interface controller board;
   means for recovering write operations interrupted by a system power instability using a log of write operations stored in the write journal; and
   means for transferring log entries for recovered write operations to a storage device following recovery of the interrupted write operations.

22. The system of claim 21, wherein the means for controlling a bus interface controls a Small Computer System Interface (SCSI).

23. The system of claim 21, wherein the means for controlling a bus interface controls a Peripheral Component Interconnect (PCI) interface.

24. The system of claim 21, wherein the storage device is a disk drive.

25. The system of claim 21, wherein the storage device is a Redundant Array of Independent Disks (RAID).

* * * * *